3,369,050
SEPARATION, RECOVERY AND RECYCLE OF THE CATALYST COMPLEX IN THE OXO PROCESS
Charles R. Greene, Berkeley, Calif., assignor to Shell Oil Company, New York, N.Y., a corporation of Delaware
Continuation-in-part of applications Ser. No. 143,447, Oct. 6, 1961, and Ser. No. 168,231, Jan. 23, 1962. This application Oct. 20, 1964, Ser. No. 405,049
5 Claims. (Cl. 260—632)

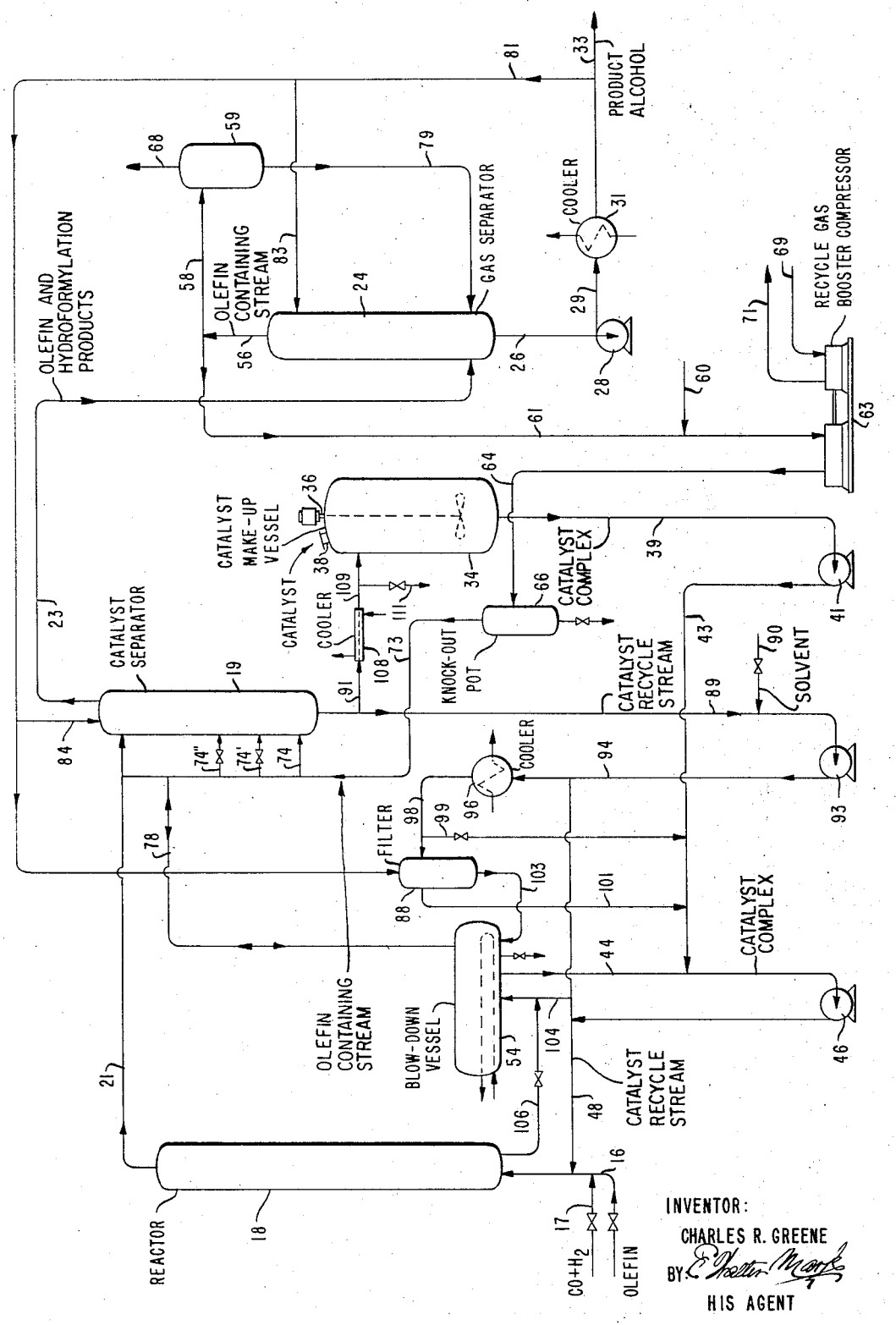

ABSTRACT OF THE DISCLOSURE

Recovering cobalt in complex combination with carbon monoxide and an organo-phosphine, suitable for recycling, from hydroformylation reactor effluent in the presence of an olefinic hydrocarbon.

---

This invention relates to an improved process for the conversion of olefins to carbonylic compounds having at least one more carbon atom. The invention relates more particularly to the direct, single stage production of carbonylic compounds comprising alcohols by reaction of an olefinic compound with carbon monoxide and hydrogen in the presence of a complex catalyst comprising a transition metal-containing component. A particular aspect of the invention relates to direct, single stage conversion of olefinic compounds to carbonylic compounds comprising alcohols in the presence of complex catalysts comprising a transition metal component providing for improved separation and recovery of the catalyst complex within the system.

This application is a continuation-in-part of copending applications S.N. 143,447, filed Oct. 6, 1961, and 168,231, filed Jan. 23, 1962, now both abandoned.

Processes for the conversion of olefins to valuable products such as, for example, alcohols and aldehydes are well known. Some involve the addition of carbon monoxide to the olefin molecule under conditions resulting in an increase in carbon atoms while providing combined oxygen in the resulting product. Various terminology has been used in connection with these conversion processes, such as oxonation, oxo process, hydroformylation, and the like. Many materials have been disclosed as catalysts for the reaction; particularly various transition metal carbonyls. For example, certain cobalt carbonyls are used as catalysts in the oxo process and results of varying degrees of efficiency have been obtained therewith. In general, the latter processes result in the obtaining of a product predominating in aldehydes. When alcohols are the desired products the aldehydes are first freed of the oxonation catalyst by methods often necessitating the destruction of the catalyst, and the aldehydes are thereafter subjected to hydrogenation in the presence of a suitable hydrogenation catalyst to yield the desired alcohol.

More recently, the usefulness as hydroformylation catalysts of certain complexes comprising a transition metal in complex combination with both carbon monoxide and certain other ligands was discovered as disclosed and claimed in copending applications Ser. Nos. 280,132, filed May 13, 1963; and 293,247; 293,250; 293,251, filed July 8, 1963, which issued as U.S. 3,239,569; 3,239,570; 3,239,571 and 3,239,566, respectively, on Mar. 8, 1966, and which are continuations-in-part of Ser. No. 46,071, filed July 29, 1960, now abandoned. These complex catalysts are found to be attractive from the standpoint of conversion, efficiency, selectivity, reaction conditions and economics. These complex catalysts comprise broadly the complexes between a transition metal having an atomic number from 23 to 85, carbon monoxide and a biphyllic ligand containing a trivalent atom selected from Group V–A of the Periodic Table having an atomic number from 15 to 51, wherein the trivalent atom has one pair of electrons. As used herein, Group V–A of the Periodic Table refers to the Group as shown in the Handbook of Chemistry and Physics, 40th Ed., pp. 448–449 (Chemical Publishing Company). Preferred for the purpose of the present invention are the complex catalysts of the above-defined class comprising cobalt in complex combination with carbon monoxide and a phosphorus-containing ligand consisting essentially of a tertiary organo phosphorus compound in which the phosphorus is trivalent (referred to herein as phosphines). In its active form the suitable complex cobalt catalyst will contain the cobalt component in a reduced valence state. This will normally be a zero valence state and may suitably be even lower, such as a $-1$ valence state.

As used throughout this specification and claims, the term "complex" means a coordination compound formed by the union of one or more electronically rich molecules or atoms capable of independent existence with one or more electronically poor molecules or atoms, each of which is also capable of independent existence.

In the suitable ligands containing trivalent phosphorus comprised in the complex catalyst employed in the process of the invention, the phosphorus atom has one available or unshared pair of electrons. Any essentially organic derivative of trivalent phosphorus with the foregoing electronic configuration is a suitable ligand for the cobalt-containing catalysts of the present invention. When trivalent phosphorus has such an electronic configuration, it is capable of forming a coordinate bond with cobalt in its 0 and $-1$ valent state. It thus will operate as a ligand in forming the desired cobalt complexes used as catalysts in the present process.

Organic radicals of any size and composition may be bonded to the phosphorus atom. Contemplated within the scope of this invention, therefore, are trivalent phosphorus compounds having aliphatic, and/or cycloaliphatic, and/or heterocyclic, and/or aromatic radicals satisfying its three valences. These radicals may contain a functional group such as the carbonyl, carboxyl, nitro, amino, hydroxy functional groups, saturated or unsaturated carbon-to-carbon linkages, as well as saturated and unsaturated non-carbon-to-carbon linkages.

It is also suitable for an organic radical to satisfy more than one of the valences of the phosphorus atom, thereby forming a heterocyclic compound with a trivalent phosphorus atom. For example, an alkylene radical may satisfy two phosphorus valences with its two open valences and thereby form a cyclic compound. Another example would be the alkylene dioxy radical to form a cyclic compound where oxygen atoms link an alkylene radical to the phosphorus atom. In these two examples, the third phosphorus valence may be satisfied by any other organic radical.

Another type of structure involving trivalent phosphorus having an available pair of electrons are those containing a plurality of such phosphorus atoms linked by organic radicals. This type of a compound is called a bidentate ligand when two such phosphorus atoms are present, a tridentate ligand when three such phosphorus atoms are present, and so forth. Examples of these polydentate ligands include such structures as:

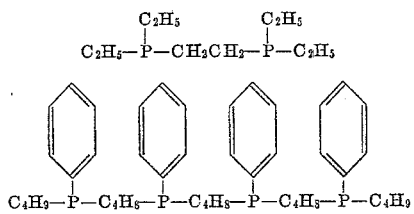

and the like.

Suitable catalysts within the scope of those employed in the process of the invention include the tertiary organophosphine-cobalt-carbonyl complexes represented by the empirical formula:

$$(R_3P)_p Co(CO)_n \qquad (I)$$

wherein R is an organic radical and $p$ and $n$ are integers, each having a value of at least 1 and whose sum is 4. Each R in the foregoing formula may represent, for example, a hydrocarbyl group, such as alkyl (including cycloalkyl) aryl, alkaryl, aralkyl; a hydrocarbyloxy group such as alkoxy, aralkoxy; and the like. The phosphorus-containing ligand $(R_3P)$ component of the complex catalyst may thus suitably be tertiary phosphine, such as a trialkyl phosphine, a trialkarylphosphine, a triarylphosphine, a triaralkylphosphine, a trialkoxyphosphine, and the like. The hydrocarbyl and hydrocarbyloxy components, R, need not necessarily be the same and suitable tertiary organophosphine ligands comprise the mixed phosphines wherein two or more of the three substituent R's are different members of the groups comprising alkyls, aryls, aralkyls, alkaryls, alkoxy, aralkoxy, and the like. As indicated above, the substituent R's may contain oxygen, halogen (preferably middle halogen) or sulfur atoms. Preferred catalysts of the above-defined class comprise those wherein each R contains from 1 to 20 carbon atoms, and the total number of carbons in the tertiary organophosphine $(R_3P)$ group does not exceed about 30. A particularly preferred group of catalysts within the above-defined class are the trialkylphosphine-cobalt-carbonyl complexes wherein the phosphorus-containing component of the catalyst is a trialkylphosphine in which each alkyl is a lower alkyl having from 1 to 20, and preferably from 4 to 15 carbons of straight or branched chain structure.

It is to be understood that the suitable catalysts identified by the foregoing empirical Formula I may comprise two or more of the $[(R_3P)_p Co(CO)_n]$ groups. For example, in the suitable catalysts, the complex between cobalt, carbon monoxide, and phosphorus-containing ligand identified by the foregoing empirical Formula I may be monomeric in structure or may be composed of several monomeric units. Thus, the complex formed between cobalt, carbon monoxide and trialkyl phosphine, such as triethylphosphine-cobalt-carbonyl, tri-n-butylphosphine-cobalt-carbonyl, etc., may be present as a dimer.

Specific examples of suitable catalysts of the above-defined class comprise complexes between cobalt, carbon monoxide, and one of the following tertiary organophosphines:

Trimethylphosphine
Triethylphosphine
Tri-n-butylphosphine
Triamylphosphines
Trihexylphosphines
Tripropylphosphine
Trinonylphosphines
Tridecylphosphines
Di-n-butyl octadecylphosphine
Dimethyl-ethylphosphine
Diamylethylphosphine
Trilaurylphosphine
Triphenylphosphine
Tris(dimethylphenyl)phosphine
Ethyl-bis(beta-phenylethyl)phosphine
Tricyclopentylphosphine
Tricyclohexylphosphine
Dimethyl-cyclopentylphosphine
Tri-octylphosphine
Diphenyl-methylphosphine
Diphenyl-butylphosphine
Diphenyl-benzylphosphine
Trilaurylphosphine
Triethoxyphosphine
n-Butyl-diethoxyphosphine Of these catalysts, the triacyclic aliphatic phosphines and trialicyclic aliphatic (cycloalkyl) phosphines are somewhat preferred. A particularly preferred catalyst comprises cobalt-carbonyl-tri-n-butyl phosphine $$[Co(CO)_3 P(Bu)_3]_2$$

The cobalt-containing complexes used as catalysts in the process of this invention may be prepared by a diversity of methods. A convenient method is to combine an organic or inorganic salt of cobalt with the desired phosphorus-containing ligand, for example, a triorganophosphine such as a trialkylphosphine in liquid phase. Suitable cobalt salts comprise for example, cobalt carboxylates such as acetates, octoates, etc., as well as cobalt salts of mineral acids such as chlorides, sulfates, sulfonate, etc. The valence state of the cobalt may then be reduced and the cobalt-containing complex formed by heating the solution in an atmosphere of hydrogen and carbon monoxide. The reduction may be performed prior to the use of the catalysts or it may be accomplished simultaneously with the hydroformylation process of this invention. Alternatively, the catalysts may be prepared from a carbon monoxide complex of cobalt. For example, it is possible to start with dicobalt octacarbonyl and by heating this substance with a suitable phosphorus-containing ligand of the type previously described, for example, trialkylphosphine, the ligand will replace one or more of the carbon monoxide molecules, producing the desired catalyst. For additional methods of preparing the catalyst complex reference is had to said copending applications. The present invention is not limited with regard to the source or method of preparation of the catalyst complex employed.

The complex catalysts above-defined possess unique characteristics enabling them to catalyze the direct single stage production of alcohols from olefins, carbon monoxide and hydrogen.

The practical use of such soluble catalysts involves the recovery thereof for recycle and reuse in the reaction zone. Various schemes for catalyst recovery have been suggested but difficulties are expected therewith generally in connection with a breakdown of the catalyst, particularly in those instances wherein the product, in many instances principally an alcohol, is distilled overhead at somewhat elevated temperatures, such as in excess of the product boiling point under the conditions in the catalyst separation zone. Although the mechanism of the catalyst decomposition is not thoroughly understood, it nevertheless presents a problem in some instances which has heretofore not been satisfactorily solved. In the conventional two-stage process of first making the aldehyde with the conventional cobalt carbonyl catalyst followed by hydrogenation of the aldehyde using nickel hydrogenation catalyst, the cobalt catalyst is intentionally decomposed and metallic cobalt filtered out in order to avoid co-poisoning of the nickel hydrogenation catalyst.

The present invention contemplates in its broadest aspects the provision of improved means for effecting the separation of product from transition metal complex catalyst and the return of the catalyst to the reaction zone for its further use therein, without substantial loss thereof by decomposition. Briefly stated, the invention provides for the separation of product from catalyst in a catalyst separating zone by distillation in the presence of a controlled concentration of a protective agent for the catalyst itself. Suitable protective agents comprise olefinic hydrocarbons, preferably in combination with carbon monoxide. Preferred olefinic hydrocarbons comprise those having the same number or a lesser number of carbon atoms to the molecule than the olefin being hydroformylated. It is a particular feature of the invention to provide this material from a part of the over-all system. For example, and as illustrative of a specific embodiment of the invention, in the manufacturer of n-butanol from propylene, carbon monoxide, and hydrogen in the presence of cobalt carbonyl-tri-n-butylphosphine complex catalyst, the reactor effluent contains product and unconverted reactants along with a considerable amount of the cobalt catalyst dissolved therein. It has now been discovered that the maintenance of a controlled critical amount of propylene, preferably together with a controlled amount of carbon monoxide, during the distillation in the catalyst separating zone wherein separation of product from catalyst is carried out, effectively minimizes decompositon of the catalyst. The catalyst may be separated in solution in a portion of the product or other suitable inert sufficiently high-boiling liquid carrier for the catalyst. Instead of propylene, other sufficiently volatile olefinic hydrocarbons or similarly hydrogenatable substances may be used, and especially when molecular hydrogen such as may be in recycle gases, is present.

The invention will be more readily understood from a consideration of the detailed description thereof set forth herein taken in conjunction with the accompanying drawing which is a simplified flow diagram of one form of apparatus suitable for carrying out the process in accordance with the invention.

In order to fully accomplish the objective of the invention, a controlled amount of olefinic hydrocarbon and preferably carbon monoxide is maintained in the catalyst separating zone. The olefinic hydrocarbon, for example, an olefin having an equal or lesser number of carbon atoms to the molecule than the olefine being hydroformylated is maintained in the catalyst separating zone in a concentration of from about 0.5 to about 50% by weight based on the total content of the catalyst separating zone. The partial pressure of carbon monoxide in the catalyst separator is maintained in the range of from about 15 to about 125 pounds absolute. It is preferred to utilize as the protective agent in the stripping or distillation zone constituting the catalyst separating zone a sufficient amount of the feed olefin, as for example propylene in the case of n-butanol production, or butylene in the case where $C_5$ alcohols are made. Olefins other than the olefin being hydroformylated may be used especially in those situations wherein higher alcohols or aldehydes are being produced. It is at times advantageous to use as the protective agent in the catalyst separation zone a material having more than one carbon atom less than the product of the reaction. For example, in the direct, single stage preparation of $C_8$ alcohols from a $C_7$ olefin, when propylene is injected into the separation zone as protective agent or fed thereto at an earlier stage in the process, an additional advantage of providing such a lower boiling material resides in its utility in the separation process of assisting in stripping the product from any bottoms material including the complex catalyst. Hence, the invention contemplates not only the provision of suitable means for the preservation of the particular complex catalyst in a condition suitable for recycle but also enables the more rapid and economical removal of overhead product. When a lower molecular weight olefin is used, in some circumstances and under certain processing conditions, some corresponding product may result from its conversion in the catalyst separating zone. Thus, when propylene, for example, is used in the catalyst separating zone wherein cobalt carbonyl/tri-n-butylphosphine catalyst is separated from n-hexanol product and unreacted amylene feed, a minor amount of propylene may be converted to n-butanol if the conditions in the separation zone are such as to allow for its formation. However, one skilled in the art may so adjust the processing conditions as to utilize the advantages inherent in using a lower boiling material as a medium in the separation zone, meanwhile minimizing the formation of a product which may not be particularly desired.

An important consideration in the determination of the particular material to be used as medium in the separation zone, in addition to its compatibility with the other substances present therein as well as its being readily hydrogenatable, is the relative volatility thereof as represented practically by its physical properties, in particular, its boiling point under the conditions prevailng in the catalyst separating zone. The acceptability of any particular medium from this point of view depends on the reactants fed to the process as well as to the products to be produced. It has been found, in this connection, that a controlled excess of olefin feed serves the intended purpose as medium in the separation zone as well as reactant in the reaction zone with a maximum of efficiency although, as has been pointed out hereinbefore, an even lower molecular weight material added thereto in lieu of an excess of olefin feed or in combination therewith may often be found desirable and especially advantageous under certain processing conditions.

Referring in general to the drawing, a feed mixture comprising an olefin, carbon monoxide and a suitable active hydrogen material, such as molecular hydrogen, is mixed with recycle and/or fresh complex catalyst, optionally in a suitable catalyst solvent or liquid carrier as desired, and reacted in reactor 18 under olefin hydroformylating conditions. The reaction mixture, containing reaction product, unreacted feed reactants, catalyst and liquid catalyst carrier when used, is then distilled, as by flashing and/or fractionation in catalyst separator 19 under conditions to separate product and lower boiling components; especially unreacted olefin, carbon monoxide and hydrogen, as an overhead vapor fraction, and catalyst with liquid catalyst carrier as a liquid bottoms fraction suitable for recycle to the reactor 18. The catalyst separation may be carried out, if desired, by a first suitable pressure reduction with flashing off of unreacted CO and $H_2$, and a portion or substantially all of the unreacted olefin, depending on the particular olefin used, with concomitant temperature reduction, followed by a separate distillation, while stripping with a gas of a suitable protective agent, to distill product from catalyst. The product is condsened, as in condenser or gas separator, 24, and withdrawn as liquid which can be further purified or processed as desired. In order to minimize catalyst decomposition and formation of free metal in the catalyst separator a controlled amount of olefin is maintained in the catalyst separator. The concentration of olefin in the liquid should be greater than the concentration of hydrogen in the liquid. This is obtained by injecting a stream of olefin-containing gas into the separator, preferably at least a portion into the bottom; additional amounts may be injected at different levels as desired. The gas so introduced into the catalyst separator, comprising, for example, an olefin corresponding to the olefin reactant, is removed with the overhead from the catalyst separator 19, it is again recovered from higher boiling oxygenated products in gas separator 24. A portion of the olefin-containing gas separated in gas separator 24, either containing unreacted CO and/or $H_2$ or subsequently separated therefrom by further cooling, is recycled to separator 19 to again provide and/or maintain the controlled protective environment for the catalyst during the catalyst separation.

The recovered catalyst, together with the solvent or liquid carrier, is recycled, together with catalyst make-up as required from the bottom of catalyst separator 19 to reaction zone 18.

Referring now in greater detail to the attached drawing: an olefin, for example, propylene emanating from an outside source through line 16, is introduced into a reaction zone comprising reactor 18. Synthesis gas, comprising carbon monoxide and hydrogen, is forced through valved line 17 into line 16 to admix therein with the propylene feed. The ratio of hydrogen to carbon monoxide in the synthesis gas employed may suitably range from about 1 to 1 to about 10 to 1. Higher or lower ratios may, however, be used within the scope of the invention. Catalyst consisting essentially of cobalt in complex combination with a trihydrocarbyl phosphine, for example, tri-lower alkyl phosphine such as tri-n-butyl phosphine, dissolved or suspended in a suitable organic vehicle, for example, an alcohol such as n-butyl alcohol and/or higher boiling by-product of the process, emanating through line 48, is also introduced into line 16, whence it flows in admixture with the propylene, carbon monoxide and hydrogen into reactor 18. Instead of the preformed catalyst, complex components such as a cobalt compound, for example, cobalt octacarbonyl and the tri-alkyl phosphine may be added to the charge or catalyst recycle to the reactor. As stated above under the hydroformylating conditions prevailing in the reactor the complex consisting essentially of cobalt in complex combination with both carbon monoxide and the tri-alkyl phosphine will be formed. A concentration of cobalt-carbonyl-tri-hydrocarbyl phosphine complex in the reaction zone providing a cobalt content calculated as elementary cobalt, in the range of from about 0.01 to about 7%, preferably from about 0.2 to about 1% by weight, based on total reactor contents is satisfactory. Within reactor 18 the mixture charged is subjected to olefin hydroformylating conditions of temperature and pressure thereby resulting in the reaction of the olefin with carbon monoxide and hydrogen to form products comprising saturated aldehydes and alcohols generally predominating in alcohol having one more carbon than the olefin charged. While the drawing shows a single reactor a plurality may be used connected in series flow wherein effluence from the last reactor of the series of reactors is passed to a suitable separation zone. The reaction mixture is passed from reactor 18 through line 21 to a catalyst separating zone, for example, catalyst separator vessel 19. The pressure in the reaction zone may be maintained at about atmospheric to about 2000 p.s.i.g., a pressure of from about 300 to about 700 p.s.i.g. being preferred. A temperature in the range of from about 100 to about 250° C., and preferably from about 150 to about 180° C., is maintained in the reaction zone.

Within catalyst separator vessel 19 a pressure of, for example, from about atmispheric to about 550 p.s.i.g., and preferably from about 55 to about 500 p.s.ig., and a temperature in the range of from about 60° to about 180° C., preferably 130 to about 177° C., are maintained. A temperature of about 165° C. and a pressure of about 470 p.s.i.g. within catalyst separator 19 has been found satisfactory in the direct single stage hydroformylation of propylene to butanol in accordance with the invention. Within catalyst separator 19, the effluence from reactor 18 is subjected to suitable distillation to effect the separation of a vapor fraction comprising unconverted charge comprising propylene, carbon monoxide and hydroformylation products, for example, n-butanol when hydroformylating propylene as well as some aldehyde such as butyraldehyde, from a liquid fraction comprising catalyst, catalyst components, and higher boiling by-products. A part of the hydroformylation alcohol product, for example, butanol, may be retained in the liquid bottoms to function as solvent or carrying medium for the catalyst.

The vapor fraction separated in catalyst separator 19 is passed through line 23 into a suitable gas separating zone comprising, for example, a column 24. Within column 24 a vapor fraction comprising materials lower boiling than the hydroformylation products is separated from a liquid fraction comprising the hydroformylation products. When hydroformylating propylene the vapor fraction separated in column 24 will comprise propylene in admixture with carbon monoxide and other fixed gases present. The liquid fraction will then comprise butanol in predominating amount and some butyraldehyde and higher boiling by-products. The separation within column 24 is effected by suitable conventional means comprising one or more such steps as, for example, distillation, fractional condensation, and the like. Thus, when hydroformylating propylene the liquid fraction comprising butanol is withdrawn from column 24 through line 26 at a temperature of about 71° C. through pump 28, line 29, through cooler 31 wherein it is cooled to about 43° C., and finally withdrawn from the system through line 33.

A catalyst make-up vessel 34, containing suitable agitating means, for example, mechanical agitator 36, is provided for the convenient preparation and supply of catalyst to the system. Preformed catalyst or catalyst components are fed either continuously or batchwise through port 38 into vessel 34. Make-up solvent for the catalyst may also be introduced at this point. In the particular embodiment illustrated herein, for the hydroformylation of olefins such as propylene, catalyst make-up materials include a cobalt compound such as, cobalt octoate, cobalt hydrate or cobalt carbonate, and a trihydrocarbyl phosphine. Synthesis gas, comprising carbon monoxide and hydrogen, is forced into vessel 34 by suitable means not shown in the drawing. The temperature in the make-up vessel 34 may vary over relatively wide limits; at a pressure of about 1 atmosphere a temperature of from about 93 to about 150° C. is satisfactory. The preformed catalyst and/or catalyst components are withdrawn from vessel 34, through line 39, via pump 41, lines 43 and 44, and pumped by pump 46 into lines 48 and 16 leading into reactor 18.

At least a part of the gaseous fraction separated in column 24 is withdrawn therefrom via line 56 and split into two portions, one passing through line 58 into gas demister 59, and the second portion passing through line 61 through recycle gas booster compressor 63 and line 64 into recycle gas liquid knock-out pot 66. Overhead from demister 59, is bled off through line 68. Recycle gas passes overhead from knock-out pot 66, via line 73 and lines 74, 74′ and 74″ into catalyst separator vessel 19 and optionally into line 21. Olefins and/or carbon monoxide may be added to, or withdrawn from, the mixture flowing through line 73 by means not shown in the drawing to provide the desired olefin and CO concentration in catalyst separator 19. Pressure equalizer line 78 is provided between blow-down vessel 54 and line 21.

Condensate line 79 leads from demister 59 into column 24. A portion of the material in line 33 is passed via lines 81 and 83 into an upper section of column 24 to provide for direct cooling therein. Another portion passes through lines 81 and 84 into a top section of catalyst separator 19 as scrubbing medium and/or reflux. A still further portion may optionally be passed through line 81 to a catalyst filter 88 as wash.

The liquid fraction, comprising catalyst and catalyst components, as well as solvent and/or entraining medium, separated in catalyst separator 19, is passed therefrom through line 89, pump 93, lines 94 and 48 into line 16, feeding into reactor 18. A valved line 90 is provided for introduction of additional solvent or suspending medium for the catalyst into the system from an outside source. Such suitable solvents may comprise alcohols, for example, aliphatic saturated alcohols having the same or a higher boiling temperature than the alcohols being produced, or any other suitable solvent or suspending medium for the catalyst which is stable under the reaction conditions employed. Such solvents, when higher boiling than the alcohol produced are again separated from reactor effluence with the catalyst in catalyst separator 19 and recycled to the reactor.

A filter 88 is provided, and a part of the catalyst-containing stream passing through line 94 may be diverted therethrough by means of line 98 provided with cooler 96 should this at times be desired. Filter 88 is in direct communication with line 43 and vessel 54 by means of lines 101 and 103, respectively. A by-pass line 99 connecting lines 98 and 43 is provided.

If desired, make-up catalyst components comprising, for example, a suitable cobalt compound starting material for example cobalt octoate and the tri-hydrocarbyl phosphine may be introduced as such directly into catalyst recirculating line 48. Upon mixing with the synthesis gas in the charge line the desired catalyst complex will be formed within the charge line leading to the reaction zone. The charge line may thus function as the make-up catalyst preforming zone. The latent heat in the recycling catalyst as well as the preheating of the synthesis gas and/or olefin feeds will provide the necessary heat to accelerate catalyst complex formation in the feed line to the reactor.

A part of the catalyst-containing recycle stream passing through line 89 may be diverted therefrom by means of line 91, cooler 108 and line 109 into the catalyst make-up vessel 34. A portion of the stream flowing through 109 may be bled continuously or intermittently from the system.

While the foregoing detailed description of the drawing represents a preferred embodiment of the invention wherein normal butanol is produced by the hydroformylation of propylene, is not intended to limit the invention to that specifically shown therein but only insofar as set forth within the spirit and scope of the claims appended hereto.

The proportions in which reactants are fed to the reaction zone may vary over relatively wide limits within the scope of the invention. For example, from about 1 to about 5 molar amounts of olefin may be reacted with from about 1 to about 12 moles of hydrogen and about 1 to about 7 moles of carbon monoxide. Sufficient amounts of olefin are however included in the feed to the reaction zone, and/or more olefinic medium is supplied to the catalyst separation zone directly, to assure the presence in the catalyst separating zone of the necessary concentration of olefinic protecting agent for the catalyst. While the foregoing example sets forth certain specified molar amounts of feed reactants, it is understood that variations therein and proportions thereof with each other are permissible and often advantageous within the scope of the invention.

The admixture of promoters, stabilizers and the like to system may by resorted to within the scope of the invention. Thus, minor amounts of phenolic stabilizers such as hydroquinone, alkaline agents such as hydroxides of alkali metals as NaOH, KOH, etc. may be added to the reaction system.

The process of the invention is applied broadly to the hydroformylation of olefinic compounds to carbonylic compounds having one more carbon atom to the molecule than the olefinic compound charged. It is applied with advantage to the hydroformylation of any aliphatic or cycloaliphatic compound having at least one ethylenic carbon to carbon bond. Thus, it is applied to the hydroformylation of olefins having from 2 to 19 carbon atoms to reaction mixtures predominating in aliphatic aldehydes and alkanols having one more carbon atom than the starting olefin. Suitable hydrocarbon charge materials include both branched and straight chain compounds having one or more ethylenic or olefinic sites. These sites may be conjugated as in 1,3-butadiene, or non-conjugated as in 1,5-hexadiene. The unsaturated carbon-to-carbon olefinic linkages may be between terminal and their adjacent carbon atoms, as in 1-pentene, or between internal chain carbon atoms, as in 4-octene.

The invention is applicable to hydroformylation of single olefins, such as, for example, ethylene, propylene, butylenes, amylenes, hexenes, heptenes, octenes, nonenes, decenes, undecenes, dodecenes, tridecenes, tetradecenes, pentadecenes of straight and branched structure, their homologues; mixtures of two or more thereof; hydrocarbon fractions consisting predominantly of olefins having the same number of carbons as well as wider boiling fractions of olefinic hydrocarbons; etc.

Hydroformylation of macromolecular materials involving acyclic unsaturated units such as polydiolefins like polybutadiene, as well as copolymers of olefins and diolefins like the styrene-butadiene copolymers, is also comprised within the scope of the invention.

Hydrocarbon cyclic compounds having olefinic unsaturation are also hydroformylated in the process of the invention. These include the unsaturated, alicyclic hydrocarbons such as the cyclic olefins containing carbon-to-carbon unsaturation such as the cycloalkenes like cyclopentene, cyclohexene, cycloheptene, etc. Also included in this category are the terpenes and fused-ring polycyclic olefins such as 2,5-bicyclo (2,2,1)-heptadiene, 1,4,4a,5,8,8a-hexahydro-1,4,5,8-dimethanonaphthalene, etc.

The process of the invention is also applied to the hydroformylation of ethylenic carbon-to-carbon linkages of non-hydrocarbons. Thus, it is possible to hydroformylate olefinically unsaturated alcohols, aldehydes and acids to the corresponding alcohols, aldehydes and acids containing an aldehyde or hydroxy group on one of the carbon atoms which was unsaturated in the starting material.

The invention is applied with advantage to the direct, single stage hydroformylation of olefinic hydrocarbons to reaction mixtures comprising saturated aldehydes and alcohols in which the alcohols predominate. A specific application comprises the hydroformylation of higher olefins and olefinic fractions, for example, olefins having from 9 to 19 carbons, and fractions thereof, to alcohols having one more carbon than the starting materials of particular value as detergent alcohols.

The following examples are illustrative of the invention. The numbers appearing in parentheses in the examples identify a corresponding part of the apparatus as shown in the drawing by identical reference characters.

*Example I*

In a continuous operation 22,000 gallons of n-butanol, to which cobalt octoate and tri-n-butyl phosphine has been added in equimolar proportions and in amounts to obtain a total cobalt concentration of 1% w. in the resulting mixture, calculated as elementary cobalt, is charged to the reaction system and circulated through the reaction loop (reactor 18, catalyst separator 19 and catalyst recirculation lines 89–94–48–16). The reactor is maintained at a temperature of 165° C., 500 p.s.i.g. A feed consisting of propylene, carbon monoxide and hydrogen is introduced at a rate of 5 cubic feet per hour of propylene, 5.5 cubic feet per hour of CO and 11.3 cubic feet per hour of $H_2$ into the reactor 18 via the charge lines 16–17. The reactor is operated with a liquid hourly space velocity (LHSV) of 0.66. The reactor 18 effluent comprising unreacted feed components, butanol, cobalt complex consisting of cobalt in complex combination with CO and tri-n-butyl phosphine, as determined by analysis of a sample stream, passes through transfer line 21 to a catalyst separator 19 wherein it is distilled at 170° C. and 490 p.s.i.g. to separate an overhead fraction consisting of butanol, propylene, CO and $H_2$ from a liquid fraction consisting essentially of butanol and said catalyst complex. The overhead fraction passes from catalyst separator 19 through line 23 into a gas separator 24 wherein it is subjected to fractional condensation to separate as overhead a gas fraction comprising CO and propylene from a liquid bottoms fraction consisting essentially of n-butanol. The overhead gas fraction is passed from the gas separator 24 through line 61 and with the aid of a compressor 63 forced into the catalyst separator 19 (via lines 64–73–74–

74'–74"). The gas so recycled from the gas separator 24 to the catalyst separator 19 is controlled to obtain the passage of an amount of butanol overhead in the catalyst separator 19 which is equivalent to butanol produced in the reactor 18. The liquid phase consisting essentially of butanol and said catalyst complex is circulated from the catalyst separator 19 through the catalyst recirculation lines 89–94–48–16, to the reactor 18. Make-up catalyst components, cobalt octoate and tri-n-butyl phosphine, are added to the recirculating catalyst complex in butanol 48 to maintain the catalyst complex concentration in the reactor 18. The liquid fraction consisting essentially of n-butanol separated in the gas separator 24 is removed therefrom (lines 26–29–33) as final product. When steady state conditions are attained the propylene conversion amounts to 95% with a yield of n-butyl alcohol of 73%.

*Example II*

Under conditions substantially identical to those described in foregoing Example I propylene is hydroformylated using a feed containing a mole ratio of propylene to carbon monoxide to hydrogen of 3.0:4.0:6.3, respectively. The reactor is maintained at 160° C. and 500 p.s.i.g. The catalyst again consisted of cobalt in complex combination with CO and tri-n-butyl phosphine formed in situ by introducing into the reactor a stream of n-butanol containing equimolar proportions of cobalt octoate and tri-n-butyl phosphine. The cobalt content of the buantol catalyst component mixture so charged, calculated as elementary cobalt is 1% w. Effluent from the reactor 18 is charged to a catalyst separator 19 consisting of a 10-tray fractionating column of the sieve tray type. Reactor effluent enters the catalyst separator 18 at plate No. 6. The catalyst separator is operated at 55 p.s.i.g. and 165° C. The overhead from the catalyst separator 19 consisting of butanol, propylene, CO and $H_2$ is passed to a gas separator 24 wherein a gas fraction comprising propylene, CO and $H_2$ is removed overhead leaving liquid bottoms consisting essentially of crude n-butanol which are removed as a final product. A part of the gas fraction taken overhead in the gas separator 24 is recycled to the catalyst separator at the feed tray (plate No. 6). The rate of gas recycle from gas separator 24 to catalyst separator 19 is controlled so that one cubic foot of propylene gas emanating from the gas separator 24 enters the catalyst separator 19 for each ten gallons of reactor effluent charged thereto. Liquid bottoms, consisting predominantly of liquid butanol containing a cobalt-CO-tri-n-butyl phosphine complex, are recycled from the catalyst separator 19 to the reactor 18 (through lines 89–94–48–16). The activity of the recycled catalyst remained unchanged. Make-up tri-n-butyl phosphine and cobalt octoate was added to the recirculating butanol-catalyst complex stream line 48. The loss in soluble cobalt from the catalyst complex is less than 0.5% w., based on total cobalt content, per pass through the catalyst separator column 19. At steady state conditions there is attained a propylene conversion of 93% with an n-butanol yield of 76%.

*Example III*

In an operation carried out in the manner described in the foregoing Example I heptene was hydroformylated at 185° C., a pressure of 1000 lbs. and a residence time of 4 hours. The catalyst vehicle in this experiment is octanol and the catalyst cobalt in complex combination with CO and tri-octyl phosphine obtained in situ by charging octanol containing cobalt octoate and tri-octyl phosphine in equimolar proportions and in amounts providing a cobalt concentration of 0.6% w., calculated as elementary cobalt in the reactor 18. Catalyst complex, determined as a complex of cobalt in combination with CO and tri-octyl phosphine, in octanol is separated as liquid bottoms from reactor effluence in a catalyst separator 19 by flash distillation in the presence of separately introduced heptene in admixture with CO. Overhead from the catalyst separator 19 was subjected to fractional distillation 24 to provide the heptene-CO gas recycled to the catalyst separator 19 and a final product consisting essentially of crude octanol. Liquid bottoms from the catalyst separator 19 are recycled to the reactor 18. Obtained is a heptene conversion of 97% with an n-octanol yield of 83%.

*Example IV*

In a similar manner of operation involving integrated olefin hydroformylation and catalyst complex recovery and recycle, butene, amylene and hexene are hydroformylated to pentanol, hexanol and heptanol, respectively, in the presence as catalyst of cobalt in complex combination with both carbon monoxide and a ligand chosen from tri-amyl phosphine, tri-hexyl phosphine and tri-amyl phosphine, respectively. Conversion of olefin charged in the range of 96 to 98% are obtained with yields of alcohols having one more carbon than the olefin reactant in the range of 82 to 86%.

I claim as my invention:

1. The process for the production of hydroformylation products comprising alcohols which consists essentially of reacting an olefinic hydrocarbon with carbon monoxide and hydrogen in the presence of a catalyst consisting essentially of cobalt in complex combination with carbon monoxide and a tri-hydrocarbyl phosphine in a reaction zone, at a temperature of from about 100 to about 250° C., and a pressure of from about atmospheric to about 2000 lbs., thereby reacting said olefinic hydrocarbon with carbon monoxide and hydrogen with the formation of hydroformylation products comprising alcohols having one more carbon atom to the molecule than said olefinic hydrocarbon in said reaction zone, passing reactor effluent comprising said hydroformylation products, carbon monoxide, hydrogen, said catalyst complex and unconverted olefinic hydrocarbon from said reaction zone into a catalyst separating zone, separating a vapor fraction comprising said hydroformylation products, carbon monoxide, hydrogen and said unconverted olefinic hydrocarbons from a liquid fraction comprising said hydroformylation products and said catalyst complex while maintaining a concentration of olefinic hydrocarbons in the range of from about 0.5 to about 50% by weight in said catalyst separating zone based on total catalyst separating zone contents to avoid any substantial decomposition of said catalyst complex in said catalyst separating zone and passing at least part of said liquid fraction from said catalyst separating zone to said reaction zone.

2. The process for the production of alkanols which consists essentially of reacting a mono-olefinic hydrocarbon with carbon monoxide and hydrogen in the presence of a catalyst consisting essentially of cobalt in complex combination with carbon monoxide and a trihydrocarbyl phosphine in a reaction zone, at a temperature of from about 100 to about 250° C., and a pressure of from about atmospheric to about 2000 lbs., thereby reacting said mono-olefinic hydrocarbon with carbon monoxide and hydrogen with the formation of an alkanol having one more carbon atom to the molecule than said mono-olefinic hydrocarbon in said reaction zone, passing reactor effluent comprising said alkanol, carbon monoxide, hydrogen, said catalyst complex and unconverted monoolefinic hydrocarbon from said reaction zone into a catalyst separating zone, separating a vapor fraction comprising said alkanol carbon monomixed, hydrogen and said unconverted mono-olefinic hydrocarbon from a liquid fraction comprising said alkanol and said catalyst complex while maintaining a concentration of olefinic hydrocarbons in the range of from about 0.5 to about 50% by weight in said catalyst separating zone based on total catalyst separating zone contents to avoid any substantial decomposition of said catalyst complex in said catalyst separating zone and passing at least a part of said liquid fraction from said catalyst separating zone to said reaction zone.

3. The process in accordance with claim 2 wherein a partial pressure of carbon monoxide in the range of from about 15 to about 125 lbs. absolute is maintained in said catalyst separating zone.

4. The process for the production of butanol which consists essentially of reacting propylene with carbon monoxide and hydrogen in the presence of a catalyst consisting essentially of cobalt in complex combination with carbon monoxide and tributyl phosphine in a reaction zone at a temperature of from about 100 to about 250° C., at a pressure of from about 300 to about 700 p.s.i.g., thereby reacting propylene with carbon monoxide and hydrogen with the formation of reaction products comprising butanol in said reaction zone, passing effluent comprising butanol, propylene, carbon monoxide, hydrogen and said catalyst complex from said reaction zone into a catalyst separating zone, separating a vapor fraction comprising butanol, carbon monoxide, hydrogen and propylene from a liquid fraction comprising butanol and said catalyst complex while maintaining a partial pressure of carbon monoxide in the range of from about 15 to about 125 lbs. abs. and a propylene concentration in the range of from about 0.5 to about 50% by weight in said catalyst separating zone based on the total contents thereof to avoid any substantial decomposition of said catalyst complex in said catalyst separating zone and recycling at least a part of said liquid fraction from said catalyst separating zone to said reaction zone.

5. The process for the production of hydroformylation products comprising alcohols which consists essentially of reacting an olefinic hydrocarbon with carbon monoxide and hydrogen in the presence of a catalyst consisting essentially of cobalt in complex combination with carbon monoxide and a tri-hydrocarbyl phosphine in a reaction zone, at a temperature of from about 100 to about 250° C., and a pressure of from about atmospheric to about 2000 lbs., thereby reacting said olefinic hydrocarbon with carbon monoxide and hydrogen with the formation of hydroformylation products comprising alcohols having one more carbon atom to the molecule than said olefinic hydrocarbon in said reaction zone, passing reactor effluent comprising said hydroformylation products, carbon monoxide, hydrogen, said catalyst complex and unconverted olefinic hydrocarbon from said reaction zone into a catalyst separating zone, separating a vapor fraction comprising said hydroformylation products, carbon monoxide, hydrogen and said unconverted olefinic hydrocarbons from a liquid fraction comprising said hydroformylation products and said catalyst complex while maintaining a concentration of olefinic hydrocarbons in the range of from about 0.5 to about 50% by weight in said catalyst separating zone based on total catalyst separating zone contents to avoid any substantial decomposition of said catalyst complex in said catalyst separating zone, passing at least a part of said liquid fraction from said catalyst separating zone to said reaction zone, passing said vapor fraction separated in said catalyst separating zone into a gas separating zone, separating a gaseous fraction comprising said unconverted olefinic hydrocarbons and carbon monoxide from a liquid fraction comprising said hydroformylation products in said gas separating zone and recycling at least a part of said gaseous fraction separated in said gas separating zone to said catalyst separating zone.

References Cited

UNITED STATES PATENTS

| | | |
|---|---|---|
| 2,609,337 | 9/1952 | Taylor et al. |
| 2,793,236 | 5/1957 | Habeshaw et al. |
| 2,811,567 | 10/1957 | Mason. |
| 3,153,673 | 10/1964 | Roming. |
| 3,239,569 | 3/1966 | Slaugh et al. |
| 3,311,598 | 3/1967 | Mertzweiller et al. |

FOREIGN PATENTS 647,363  12/1950  Great Britain.

LEON ZITVER, *Primary Examiner.*

J. E. EVANS, *Assistant Examiner.*